Patented Nov. 19, 1968

3,412,100
ANTHRAQUINONE DYES FOR TEXTILE FIBERS
David J. Wallace and Max A. Weaver, Kingsport, Tenn., assignors to Eastman Kodak Company, Rochester, N.Y., a corporation of New Jersey
No Drawing. Filed Oct. 22, 1965, Ser. No. 502,458
7 Claims. (Cl. 260—329.2)

ABSTRACT OF THE DISCLOSURE 1,4-dihydroxyanthraquinone compounds having a sulfolanylamino group in the 2-position are useful as dyes for hydrophobic fibers.

---

This invention relates to novel anthraquinone compounds and, more particularly, to anthraquinone dyestuffs containing a sulfolanylamino group.

The novel anthraquinone compounds of this invention are characterized by the presence of a sulfolanylamino group in the 2-position, hydroxyl groups the 1- and 4-positions and have the following structural formula (I) 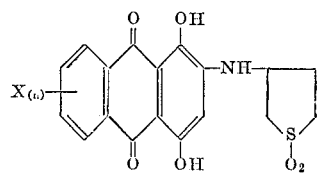

wherein:
X=hydroxy; alkoxy, e.g. methoxy; halogen, e.g. chlorine; nitro and the like and
$n = 1, 2, 3$ or $4$.

Compounds characterized by the above structural formula are prepared by reacting an appropriately substituted 2-haloquinizarin with 3-aminothiophene - 1,1 - dioxide as follows:

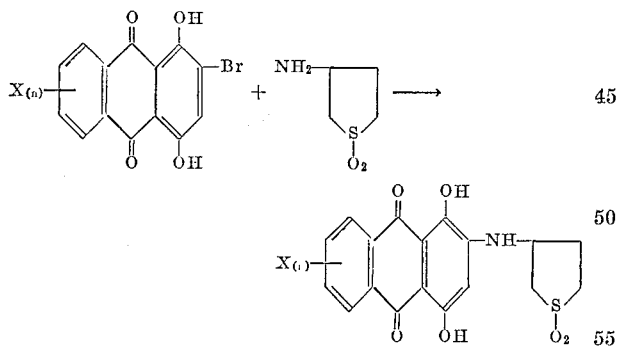

wherein X and $n$ are defined above.

Sulfolanylamino-substituted anthraquinones have been reported, such compounds having the sulfolanylamino group substituted in the 1- or 4-position of the anthraquinone nucleus. The reported compounds are prepared by condensing sulfolanylamine with a 1,4-dihydroxyanthraquinone, the product thus having reduced hydroxyl substitution and reduced fastness properties.

It has now been found that dyes of outstandingly superior fastness properties may be prepared by reacting a quinizarin as set forth above, with 3-aminothiophene-1,1-dioxide such that the resulting dye retains the hydroxyl groups originally present in the 1- and 4-positions of the anthraquinone nucleus. Such compounds are the subject of the present invention and are characterized by the formula I, above.

The following examples will serve to more fully illustrate the novel dyestuffs of the invention.

EXAMPLE 1

A mixture containing 3.19 g. (0.01 mole) 2-bromoquinizarin, 15 ml. 3-aminothiophene-1,1-dioxide and 20 ml. Cellosolve was stirred at 100–110° C. for 5 hr. The mixture stood overnight at room temperature and was then filtered. The filter cake was subsequently washed with methanol and dried. The product dyed Dacron a brilliant red of outstanding fastness properties and had the structure:

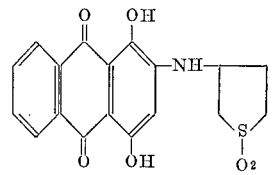

EXAMPLE 2

In accordance with the procedure of Example 1, 3.19 g. (0.01 mole) of 2-bromo-6-chloroquinizarin was stirred with 15 ml. 3-aminothiophene-1,1-dioxide in Cellosolve. The product dyed polyesters a brilliant red and had exceptional fastness properties. The dye had the structure:

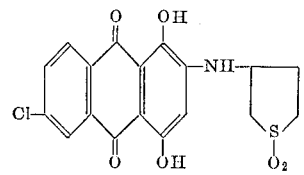

EXAMPLE 3

In accordance with the procedure of Example 1, a dye was prepared by substituting 0.01 mole of 2-bromo-5,6,7,8-tetrachloroquinizarin for 2-bromoquinizarin. The product dyed polyesters an outstandingly fast violet shade and had the structure:

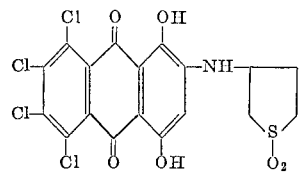

EXAMPLE 4

In accordance with the procedure of Example 1, a dye was prepared by substituting 0.01 mole of 2-bromo-5-chloroquinizarin for 2-bromoquinizarin. The product dyed Dacron a bright red and possessed exceptional fastness properties. The dye had the structure:

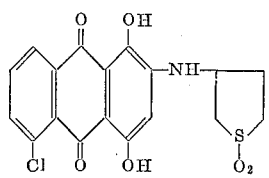

EXAMPLE 5

In accordance with the procedure of Example 1, a dye was prepared by substituting 0.01 mole of 2-bromo-5,8-dihydroxyquinizarin for 2-bromoquinizarin. The dye possessed excellent fastness properties and had the structure:

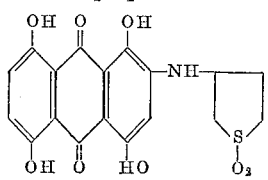

In accordance with the method of preparation set forth in Examples 1–5, a variety of dyes having the structure of Formula I may be prepared wherein X is nitro or alkoxy, e.g. methoxy, ethoxy.

As set forth above, the dyes of this invention have outstanding fastness properties, such properties resulting from the presence of the sulfolanylamino group on the 2-position of the quinizarin group and retention of hydroxyl groups on the 1- and 4-positions.

The sulfolanylaminoanthraquinone compounds of the invention may be used for imparting scarlet to violet shades to hydrophobic fibers such as linear polyester, cellulose ester, acrylic, modacrylic, polyamide, etc., fibers in the manner described in U.S. Patents 2,880,050, 2,757,064, 2,782,187 and 2,043,827. The following example illustrates a method by which the novel compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the compounds of the invention are water-insoluble, they can be applied from aqueous dispersions in the manner of the so-called "dispersed dyes." However, coloration can also be effected, for example, by incorporating the dyes into the spinning dope and spinning the fiber as usual. The compounds of our invention have varying utility as dyes. The degree of utility varies, for example, depending upon the material being dyed and the specific formula of the dye. Thus, for example, all the dyes will not have the same degree of utility for the same material. The substituents on the anthraquinone radical serve primarily as auxochrome groups to control the color of the sulfolanylaminoanthraquinone compound.

Polymeric linear polyester materials of the terephthalate type are illustrative of the linear aromatic polyester textile materials that can be dyed with the new compounds of our invention. The terephthalate fibers sold under the trademarks "Kodel," "Dacron," and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, U.S. Patent 2,465,319. The polymeric linear polyester materials disclosed in U.S. Patents 2,945,010, 2,957,745 and 2,989,363 for example, can be dyed. The linear aromatic polyester materials specifically named have a melting point of at least 200° C.

Nylon, in fiber, yarn and fabric form, is representative of polyamides which can be dyed with the compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:
1. A sulfolanylaminoanthraquinone dye characterized by the general formula

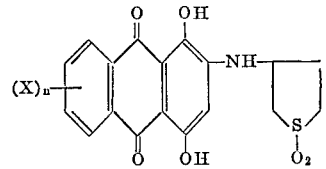

wherein:
X=hydroxy or halo and
$n$=0, 1, 2, 3 or 4.

2. The dye characterized by the formula of claim 1 wherein
X=hydroxy or chlorine.

3. The dye:

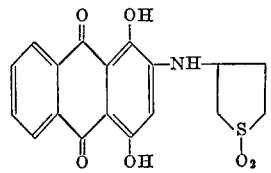

4. The dye:

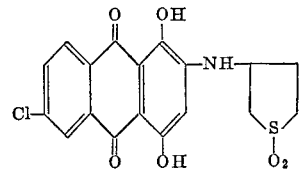

5. The dye:

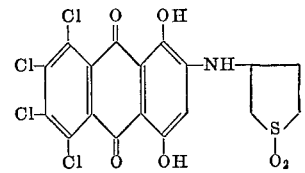

6. The dye:

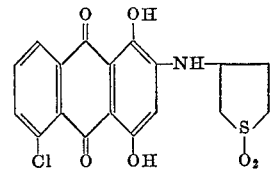

7. The dye:

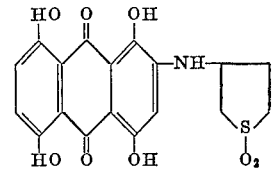

References Cited
UNITED STATES PATENTS 3,086,977   4/1963   Turetzky _____ 260—272
3,249,626   5/1966   Neeff et al. _____ 260—329.2

OTHER REFERENCES

Venkataraman: Chem. Syn. Dyes (Academic Press, N.Y., 1952), vol. II, p. 1210.

HENRY R. JILES, *Primary Examiner.*

C. M. SHURKO, *Assistant Examiner.*